US009047373B2

(12) United States Patent
Ásmundsson et al.

(10) Patent No.: US 9,047,373 B2
(45) Date of Patent: Jun. 2, 2015

(54) MULTIMEDIA IDENTIFIER

(75) Inventors: Fridrik Heidar Ásmundsson, Mosfellsbaer (IS); Björn Thor Jónsson, Reykjavik (IS); Kristleifur Dadason, Reykjavik (IS); Herwig Lejsek, Scheibbs (AT); Laurent Amsaleg, Guichen (FR)

(73) Assignee: Háskólinn í Reykjavik, Reykjavik (IS)

( * ) Notice: Subject to any disclaimer, the term of this patent is extended or adjusted under 35 U.S.C. 154(b) by 264 days.

(21) Appl. No.: 13/132,597

(22) PCT Filed: Dec. 2, 2009

(86) PCT No.: PCT/IS2009/000014
§ 371 (c)(1),
(2), (4) Date: Aug. 24, 2011

(87) PCT Pub. No.: WO2010/064263
PCT Pub. Date: Jun. 10, 2010

(65) Prior Publication Data
US 2011/0302207 A1 Dec. 8, 2011

(30) Foreign Application Priority Data
Dec. 2, 2008 (IS) .............................................. 8771

(51) Int. Cl.
*G06F 17/30* (2006.01)
*G06K 9/00* (2006.01)
(52) U.S. Cl.
CPC ...... *G06F 17/30781* (2013.01); *G06K 9/00711* (2013.01)
(58) Field of Classification Search
CPC .................. G06F 17/30781; G06T 7/0048

USPC ............................. 707/780, 999.003, 999.005
See application file for complete search history.

(56) References Cited

U.S. PATENT DOCUMENTS

| 2002/0019819 A1* | 2/2002 | Sekiguchi et al. ................ 707/3 |
| 2007/0288478 A1* | 12/2007 | DiMaria et al. ................. 707/10 |

(Continued)

FOREIGN PATENT DOCUMENTS

WO 2007/141809 A1 12/2007

OTHER PUBLICATIONS

Zhu et al. "Inisght Video: Toward Hierarchical Video Content Organization for Efficent Browsing, Summarization and Retrieval" IEEE Transactions on Multimedia. vol. 7, No. 4, Aug. 2005. pp. 648-666.*

(Continued)

*Primary Examiner* — Yuk Ting Choi
(74) *Attorney, Agent, or Firm* — Christensen O'Connor Johnson Kindness PLLC (57) ABSTRACT

This invention relates to efficiently performing a close-duplicate search within large collections of data streams, preferably in the context of Multimedia (audio and video files or streams). In a first aspect the present invention relates to a method for feeding information of a data from a data file or a data stream into a database. In a second aspect a method is provided for tagging or identifying a data stream by querying an unknown data or data stream to a database of known data streams. In a third aspect a computer program or suite of computer programs are provided to operate the methods of this invention. The robustness of the Multimedia Identifier system of the present invention results from the use of high-dimensional descriptors, which describe local interest points extracted from the frames of audio and/or video data.

37 Claims, 7 Drawing Sheets

(56) References Cited

U.S. PATENT DOCUMENTS

2008/0189299 A1* 8/2008 Heinkel et al. .............. 707/100
2008/0201379 A1* 8/2008 Nakate ...................... 707/104.1
2009/0259633 A1* 10/2009 Bronstein et al. ............. 707/3

OTHER PUBLICATIONS

Mittal et al. "Addressing the Problems of Bayesian Network Classification of Video using High-Dimensional Features" IEEE Transactions on Knowledge and Data Engineering, vol. 16. No. 2, Feb. 2004.*

Eidenberget, Host. "Distance Measures for MPEP-7-based Retrieval", MIR'03, Nov. 7, 2003.*

Dadason, K. et al., "Eff² Videntifier: Identifying Pirated Videos in Real-Time," Proceedings of the 15th ACM International Conference on Multimedia (MM'07), Augsburg, Germany, Sep. 23-28, 2007, pp. 471-472.

Gengembre, N., and S.-A. Berrani, "A Probabilistic Framework for Fusing Frame-Based Searches Within a Video Copy Detection System," Proceedings of the ACM International Conference on Content-Based Image and Video Retrieval (CIVR '08), Niagara Falls, Canada, Jul. 7-9, 2008, pp. 211-220.

International Search Report and Written Opinion dated Apr. 2, 2010, issued in corresponding International Application No. PCT/IS2009/000014, filed Dec. 2, 2009, 11 pages.

Joly, A., et al., "Content-Based Copy Retrieval Using Distortion-Based Probabilistic Similarity Search," IEEE Transactions on Multimedia 9(2):293-306, Feb. 2007.

Royer, J., et al., "Multimedia Interactive Services Automation Based on Content Indexing," Bell Labs Technical Journal 13(2):147-154, Aug. 2008.

\* cited by examiner

MULTIMEDIA IDENTIFIER

TECHNICAL FIELD

This invention relates to efficiently performing a close-duplicate search within large collections of data streams, preferably in the context of Multimedia (audio and video files or streams).

BACKGROUND ART

With the proliferation of high-speed internet access and the availability of cheap secondary storage it has become very easy for home users to copy large amounts of data and distribute it over the web. That shared data typically contains much self-produced or free content, but in many cases also copyrighted material from third parties.

Despite the poor image quality, thousands of low-resolution videos are uploaded every day to video-sharing sites such as YouTube. It is known that this material includes a significant percentage of copyrighted movies. Other file sharing platforms, such as eDonkey or BitTorrent, are also very popular, yet illegal, sources of copyrighted material. In 2005, a study conducted by the Motion Picture Association of America was published, which estimated that their members lost 2.3 billion US$ in sales due to video piracy over the Internet ("The Cost of Movie Piracy"). Due to the high risk of piracy, movie producers have tried many means of restricting illegal distribution of their material, albeit with very limited success. Video pirates have found ways to circumvent even the most clever protection mechanisms. In order to cover up their tracks, stolen (ripped) videos are typically compressed, modified and re-encoded, making them more suitable for easy downloading. Another very popular method for stealing videos is "camcording", where pirates smuggle digital camcorders into a movie theatre and record what is projected on the screen, and upload it to the web.

A fully automatic content-based video identification system builds a reference database of low-level features (called descriptors) extracted from the videos to protect. Then, video streams to check are fed into the system to detect near- or close-duplicate content. Those streams can originate from the web (via a robot), from a TV-broadcast or from a camera installed in front of a multimedia device; a service such as YouTube could even submit uploaded videos to the system.

Detecting low-quality or even severely altered videos in very large reference databases in real-time (preferable several income streams simultaneously when monitoring TV channels) is crucial in order for a system to be usable in practice. Missing a few extremely distorted videos is generally acceptable, while it must avoid false positives at all cost.

Particular video copyright related applications have specific needs, however. Querying the system using small fractions of a video file found on the web might be sufficient to assess whether it is stolen material. Monitoring an incoming video stream to spot trailers or program boundaries requires a more detailed and continuous querying process. Furthermore, video copyright protection focuses for the most part on very recent videos. Popular movies typically make the major part of their profit in the first few months after publication. Nevertheless most movies are available online for download right after the premiere, sometimes even before. Supporting database updates is therefore key issue.

US 2006/083429 and EP 1650683 disclose the DPS2 CBCR video retrieval system using a local descriptor type, which are 20 dimensional on the lower end of the dimensionality scale. The local descriptors used in the $DPS^2$ are based on the Harris interest point detector, and encode both, spatial and temporal information around the selected interest point. Furthermore, there is a step in the $DPS^2$ system where frames of interest are selected, similar to the detection of interest points in the descriptor extraction process. This is achieved by examining the rate of motion in the source video material at a pixel level, selecting frames where overall motion in the frame is either at its least or at its most, compared to the frames around it.

It is an object of the invention to provide a method and a system for an efficient and preferably fast close-duplicate search and identification within large collections of data streams, which overcomes the deficiencies of the prior art. It is a further object of the invention to provide a method and system for close-duplicate identification which is robust towards strong modifications of the content in the stream.

These and other objects are achieved by the features of the independent claims. Further preferred embodiments are characterized in the dependent claims and discussed in the description below.

DEFINITIONS OF TERMS USED IN THE CONTEXT OF THE PRESENT INVENTION

The term "constant time" refers to the time required to retrieve the same amount of data from a datastore. Data stores in computers are hierarchically organized (Register—L1 cache—L2 cache—L3 cache—main memory—secondary storage) and one access to such a data store takes a specified constant amount of time and retrieves a constant amount of locality close data. In the case of hard disk, solid state disk or optical disk storage, constant time access to a secondary data store may have slightly different access time depending on where the data is located—nonetheless, it is still regarded as being constant.

The term "NV-tree" refers to the nearest vector tree data structure used in the implementation of preferred embodiments of the present invention, where the nearest vector is the closest matching and most similar data descriptor. WO 2007/141809 discloses the NV-tree data structure incorporated herein as a reference.

The term "Collection size" refers to the number of descriptors indexed in a database such as the NV-Tree.

The term "Locality Sensitive Hashing (LSH)" is an approximate method to quickly identify clusters of high-dimensional descriptors within a specified distance radius in medium size collections of such descriptors. The LSH is for instance described in Datar, M.; Immorlica, N., Indyk, P., Mirrokni, V. S. (2004). "Locality-Sensitive Hashing Scheme Based on p-Stable Distributions". Proceedings of the Symposium on Computational Geometry.

The term "Data store" refers to any primary (RAM) or secondary memory such as hard drives, tapes, optical disks, flash-memory drives and any other secondary storage media used in the computer industry.

The term "interest point" is one of many points in a given image which fulfils a certain criteria of the signal around this point. One very popular method to detect interest points in images and video is to find local pixel-level maxima in the amount of visual contrast.

The term "local descriptors" refers to a method to abstract and encode the signal around a specific interest point of complex data, such as images, video or audio in a numeric vector of high dimensionality. Local descriptors only cover the information around the selected interest point, as opposed to global descriptors, which encode certain features on a whole image or video frame or even just a single video file.

The Eff² local descriptor is an improved version of the SIFT local descriptor (U.S. Pat. No. 6,711,293 (Mar. 23, 2004)), which have shown to be significantly more distinctive than SIFT when searching in very large image collections, helping both retrieval efficiency and effectiveness. The Eff² local descriptors are described in Herwig Lejsek, Friðrik Heiðar Ásmundsson, Björn Þór Jónsson, Laurent Amsaleg: Scalability of local image descriptors: a comparative study. ACM Multimedia 2006: 589-598.

SUMMARY OF THE INVENTION

The present invention differs from the above mentioned prior art in a way that it does preferably not use any mechanism of discriminating frames. All frames according to the present invention are preferably snapshots of the data stream and are preferably taken at fixed time intervals. From a single frame, preferably every single frame, preferably a maximum number of local descriptors (up to 1000) are extracted. Those descriptors are preferably just extracted from the information contained in this single frame and preferably not from the information of the neighbouring frames.

In contrast the DPS² system examines first the rate of motion in the source video material at a pixel level, selecting just frames where overall motion in the frame is either at its least (a minimum) or at its most (a maximum), compared to the frames around it. Just inside those maximum or minimum frames points of interest are computed. For the extraction of the descriptors at and around these interest points, the DPS² system integrates also the signal change compared to the neighbour frames into the descriptor computation. The descriptors of the DPS² system are therefore not solely based on the information of one selected frame, but also on the change of the signal within its neighbours.

The search time in the present invention is preferably constant, for example when using the "NV-tree" data structure ("Nearest Vector tree" data structure; see definition above) or approximately constant (in case LSH (Locality Sensitive Hashing) data structure is used) and independent from the collection size.

This stands in contrast to the DPS² system where query time is (sub) linear in relation to collection size. Instead of using a projection and partitioning strategy such as NV-tree (or LSH), the DPS² system builds upon the sorting of descriptors along a Hilbert space filling curve. When issuing a search the position for the query descriptor the space filling curve is determined. Thereafter, as the Hilbert space filling curve can preserve locality fairly well, the area around this position on the space filling curve is evaluated. All descriptors residing in this area are compared to the query descriptors by computing the exact distance. If the distance is below a certain threshold, it is considered to be a descriptor match.

In a first aspect of the present invention a method is provided for feeding information of a data into a database. The information of the data may be fed from a data file or a data stream into an existing data base or a new data base may be created. The method according to the present invention preferably comprises at least one of the following steps.

In particular, the method preferably comprises the step of collecting frames from a data stream and extracting or calculating high dimensional descriptors representing a content within the frame. The data stream is preferably a video stream or an audio stream, wherein a video steam may also comprise audio data. As mentioned above, it is preferred that a group of high dimensional descriptors is extracted or calculated from individual frames, preferably from each single frame. Moreover, a high dimensional descriptor preferably comprises 15 or more dimensions.

In a next preferred step, representative descriptors are selected from a set of consecutive frames, by filtering out redundant descriptors. The selected descriptors are preferably put into sets, where each set of descriptors preferably represents a consecutive range of frames that overall contains the same or very similar content. These sets are preferably regarded as describing a scene.

Thereafter the selected descriptors are preferably labelled in the set(s) with at least an identifier. For instance, only the representative descriptors in a set of consecutive frames are labelled with a corresponding identifier; the "non-representative" or "redundant" descriptors are preferably deleted or not labelled by an identifier.

In a next step, a cluster is preferably formed or defined, on the basis of the sets of descriptors.

In a next step, the cluster may be compared with other clusters created from the same data stream. This provides the preferred advantage, that redundant descriptor may be further eliminated. For instance, two clusters which are "similar", e.g., which relate to a similar scene, are combined. As such, a cluster can preferably consist of a single set or a combination of sets of descriptors.

In a next preferred step, the identifiers of the descriptors retained from the previous step are stored on one or more storage areas and/or on one or more storage devices. It is further preferred that the identifiers are organized on the one or more storage areas and/or on the one or more storage devices such that identifiers of spatially closely located descriptors (within the high dimensional space) are preferably or with high likelihood stored within the same area or device or same device partition, which provides further advantages (see discussion below). It should be noted that there may exist whole sets of descriptors with the same identifiers, wherein the same identifiers may be grouped on disk (in the NV-Tree) into many different spatially close spaces In a second aspect of the present invention a method is provided for tagging or identifying a data stream. In particular, the method refers to querying an unknown data or data stream to a database of known data streams. In particular, an unknown data stream is analysed by applying some of the method steps of the first aspect and a comparison with stored results in an existing database. The method for querying an unknown data stream comprises at least one of the following method steps.

The method preferably comprises the step of collecting frames from the unknown data stream and extracting or calculating high dimensional descriptors representing a content within the frame. This is preferably done in a same or similar manner as described with regard to the first aspect.

In a next preferred step, representative descriptors may be selected from a set of consecutive frames, by filtering out redundant descriptors. Then, preferably, at least a set of selected descriptors may be created, where a set of descriptors representing a high percentage of the same consecutive frames, are defined as describing a scene. Again, this is preferably done in a same or similar manner as described with regard to the first aspect.

In a next optional step, a cluster which comprises at least one descriptor, preferably a plurality of descriptors are formed or defined.

In a next optional step, cluster information is compared with the stored information in the database. For instance by querying every single descriptor of a query cluster or at least a subset of descriptors of the query cluster within the storage devices of the database which comprises reference clusters of descriptor identifiers.

A next preferred step relates to retrieving all spatially closely related identifiers and aggregating the related identifiers and preferably aggregating these identifiers depending on their scene origin.

In a next preferred step when an identifier yields a high score, it is determined that the query descriptors are retrieved from cluster containing similar data.

Then the retrieved clusters are preferably evaluated by performing a regression test on the retrieved clusters, wherein a decision of a matching date result is determined when the regression signal exceeds a predefined threshold.

In a third aspect of the present invention a computer program or suite of computer programs are provided so arranged, such that when executed on one or more processors the program or suite of programs cause(s) the one or more processors to perform the methods above.

Further preferred embodiments of the invention are exemplified by the following items:

1. A method for creating a database of data streams, the method comprising the following steps;
   collecting frames from a data stream and extract high dimensional descriptors representing a content within the frame,
   selecting representative descriptors from a set of consecutive frames, by filtering out redundant descriptors,
   creating a set of selected descriptors, wherein a set of descriptors representing a high percentage of the same consecutive frames, are defined as describing a scene,
   labelling the selected descriptors in the set with an identifier,
   comparing the cluster with other clusters created from the same data stream and eliminating redundant descriptors,
   storing the identifiers of the descriptors retained from the previous step on one or more storage devices, wherein the identifiers are organized on one or more storage devices such that identifiers of spatially closely located descriptors are with high likelihood stored within the same device partition.
2. The method for querying an unknown data stream to a database of known data streams according to item 1, the method comprising the following steps:
   querying the storage devices comprising clusters of descriptors,
   retrieving preferably all spatially closely related identifiers and aggregating the related identifiers and aggregating these identifiers depending on their scene origin,
   when an identifier yields high score, determining that the query descriptors have been retrieved from cluster containing similar data,
   evaluating the retrieved clusters by performing a regression test on the retrieved clusters, wherein a decision of a matching date result is determined when the regression signal exceeds a predefined threshold.
3. The method according to item 1 or 2, wherein the high dimensional descriptors have 15 or more dimensions.
4. The method according to any of the preceding items, wherein the temporal locality of each scene is stored in a separate lookup file on a storage device.
5. The method according to any of the preceding items, wherein the temporal locality within data streams suggests that it is very likely that the same or very similar scenes are recurring within a short interval.
6. The method according to item 5, wherein the descriptor set representing a scene is compared to a small set of previously examined scenes and wherein a strong correlation between two scenes is detected results in merging or linking together such descriptors, preferably into a cluster and eliminating redundant descriptors.
7. The method according to any of the preceding items, wherein the data stream is visual information, such as a video sequence.
8. The method according to any of the preceding items, wherein the data stream is audio data.
9. The method according to any of the preceding items, wherein the data structure residing on each storage device represents one or more Nearest Vector Tree data structure.
10. The method according to any of the preceding items, wherein the data structure represents one or more LSH hash table.

In the present context called Multimedia Identifier, is a computer system designed to detect and identify close-duplicate (multimedia) data streams in an automated manner. The system is very robust towards strong modifications of the content in the stream, such as compression, frame dropping, down-sampling (as well as brightness and colour-changes, cropping and affine transformations for image and video data).

The robustness of the Multimedia Identifier system according to the present invention results from the use of high-dimensional descriptors, which describe local interest points extracted from the frames of audio and/or video data. These descriptors are preferably found in regions with high contrast, so that they will presumably be found again in modified versions of the same stream. The signal around those interest points is then encoded into a descriptor (numerical vector) of a fixed, high dimensionality. Similar regions (in respect to the content) in the data stream will be encoded in numerically similar descriptors; e.g., similar means that the Euclidean distance between them will be relatively small. Alternatively, other distance measures like the Manhattan or Hamming distance measures can be used.

The descriptors are preferably extracted on a fixed frame rate, preferably of about 0.1-30 frames per second depending on the amount of information in the data stream. As neighbouring frames are likely to contain similar content, they also yield many highly similar descriptors. The degree of spatial similarity also defines the degree of compression (scalability), as quickly changing data streams contain little duplicate information therefore yielding more descriptors. Instead consistent data streams which change their information just slightly over time can be filtered very strongly of redundant data and therefore yield less or even very few descriptors.

It is therefore advantageous to compress the information by filtering out redundant or similar information. Thus, to filter out these redundant descriptors, a first filter program may calculate the distances between all pairs of descriptors, preferably inside a given time-window, wherein each time-window preferably consisting of a fixed number of frames. Based on those distances, each descriptor builds up a list of neighbours. A neighbour descriptor is thereby defined when it has a distance smaller than a pre-defined distance threshold. Furthermore, a score for each descriptor may be calculated based on the number of close neighbours and their distance to the candidate descriptor. All descriptors within the time window are preferably sorted based on this score. The descriptor in the top position of this sorted list is selected into the candidate set of the most representative descriptors for the given time window. All its close neighbours may then given a penalty to their score, the remaining set of descriptors may be resorted and the top descriptor is chosen again. This procedure may continue until the desired number of representatives is reached.

After an optional second filtering step, the selected representative descriptors are preferably grouped into scenes of 30-2000 descriptors and sent to the database, preferably to a distributed NV-tree database, either to be inserted or as part of a query.

An advantageous feature of the system according to the present invention is the distributed high-dimensional index system. This database index system preferably comprises the following three main components:
- a coordinator node which takes in query requests: a set of descriptors representing small part of a data stream to be queried for, e.g. a single frame or a scene—typically 30-2000 descriptors.
- one or more worker nodes which execute single descriptor queries in parallel.
- a result aggregation node, which receives the partial answers from the workers and aggregates them into a final decision.

Insertions are preferably performed in a similar way, just that the designated worker inserts or feeds the descriptors into their sub-index instead of returning query results.

This form of distribution is a general method and can also be applied to other approximate high-dimensional data-structures handling local descriptor queries, such as Locality Sensitive Hashing (LSH). In the LSH case each worker machine providing the query processing can handle a single hash table, or part of one, from the whole set of hash tables, typically 6-100 hash tables in total. Meanwhile the coordinator (coordinator node) directs the queries to the correct hash tables or sub hash tables) on the worker nodes, and the workers again send the partial results to the aggregator (aggregation node). To get a stable result while avoiding false positives at all costs, the results from several consecutive scenes are preferably aggregated. To do this, the result lists are evaluated (preferably in sorted time order) and checked whether a correlation exists between the query scenes and the matching result scenes (which have been inserted into the database before); it is preferred to use linear regression for such an evaluation. In the case the regression signal exceeds a predefined threshold, the decision unit of the Multimedia Identifier according to the present invention automatically decides that the given query-data stream matches to the result sequence contained in the database.

The present invention relates to a system and a method to be executed by one or more processor in a computer program, which comprises preferably a plurality of the following phases (some of the phases may be optional depending on the specific embodiment of the present invention):

1. A method to take regular snapshots from a data stream, so-called frames, and extract on average 30-2000 local descriptors from each frame. Those descriptors are vectors of high dimensionality (15 or more dimensions) that describe part of the content within the frame.
2. A method to efficiently select the most representative descriptors from a set of consecutive frames (defined by a given time window) thereby filtering redundant close-duplicate descriptors (which are very likely to reoccur in the spatial locality after their first appearance).
3. The descriptors which are retained by the first filter step in 2 are then grouped according to the frames they represent. In case several descriptors represent a high percentage of the same consecutive frames they can be regarded as describing a scene. A scene can be defined as a range of consecutive frames, where the information inside the stream is static or changes just very little. All descriptors in the same scene are preferably labelled with the same identifier. The temporal locality of each scene (begin and end) is preferably stored in a separate lookup file on a storage device.
4. The principal of temporal locality within data streams further suggests that it is very likely that the same or very similar scenes are recurring within a short interval, e.g. refrains in songs, interviews in TVs, discussions between two persons in movies. Therefore the descriptor set representing a scene is preferably compared to a (small) set of previous examined scenes. In case a strong correlation between two scenes can be detected, those scenes are preferably merged or linked together and redundant descriptors may be further eliminated.
5. A method of storing the identifiers of the descriptor retained from phase 3 and/or 4 at one or more storage areas or on one or more storage devices. These identifiers are preferably organized on these areas or devices so that identifiers of spatially closely located descriptors fall with high likelihood within the same area or device partition.

The phases 1 to 5 are preferably used in order to extract information of the data stream and feed or insert the extracted information into a database or to create a database. Moreover, the above method steps are also preferably used for the identification of an unknown data stream. Moreover, for the identification also phases 6 and/or 7 are preferably used.

6. A method of querying these storage devices with a set of descriptors (preferably from the same scene/frame), retrieving all spatially closely related identifiers and aggregating these identifiers on a scene basis. In case one scene identifier yields an above expectancy amount of hits, it can be concluded that the query descriptors were retrieved from a scene containing close-duplicate content.
7. A method of aggregating consecutive result sets from a query data stream; evaluating them using preferably a regression test. When a signal is found, the evaluated query is considered a close-duplicate of a data stream which has previously been stored on the storage device, and has thus been recognized by the system.

In an embodiment of the present invention the method for searching through data volumes preferably comprises a plurality of the following method steps (again, some of the method steps may be optional depending on the specific embodiment according to the present invention):
a) receiving external task request, b) coordinating distribution of tasks, by means of coordinator device, where the external task request can be either a data query request or a data insertion request. Then c) a receiving task is performed, by means of one or more worker devices, followed by a d) processing task requests from the coordinator unit, by one or more worker devices, where the task can be either an insertion of data descriptors into a high-dimensional data structure, a query of single element within the data structure, or a query of sequence of elements within the data structure. Thereafter a e) receive task requests is performed, by means of aggregation device, from the one or more worker devices, where the task contains query result information from each of the worker devices, followed by f) sorting the query results from each of the workers, g) aggregating the results and h) generating a detection report from the results. The embodiment is characterized in that the data is a file or data stream which can be described by a set of numerical vectors in high-dimensional space and the data structure residing on each worker device is a high-dimensional data structure. Furthermore, the aggregation device aggregates the results first on a data descriptor bases and secondly on a data descriptor group bases.

Further embodiments include a computer program or suite of computer programs so arranged, such that when executed on one or more processors the program of suite of programs cause(s) the one or more processors to perform the method of any of embodiments above.

In one embodiment of the present invention a computer readable data storage medium is disclosed for storing the computer program or at least one of the suites of computer programs of any of embodiments above.

BRIEF DESCRIPTION OF DRAWINGS

The Present invention will now be described in relation to the following drawings with reference numbers to indicate the features described.

DETAILED DESCRIPTION OF THE INVENTION

Figure 1:
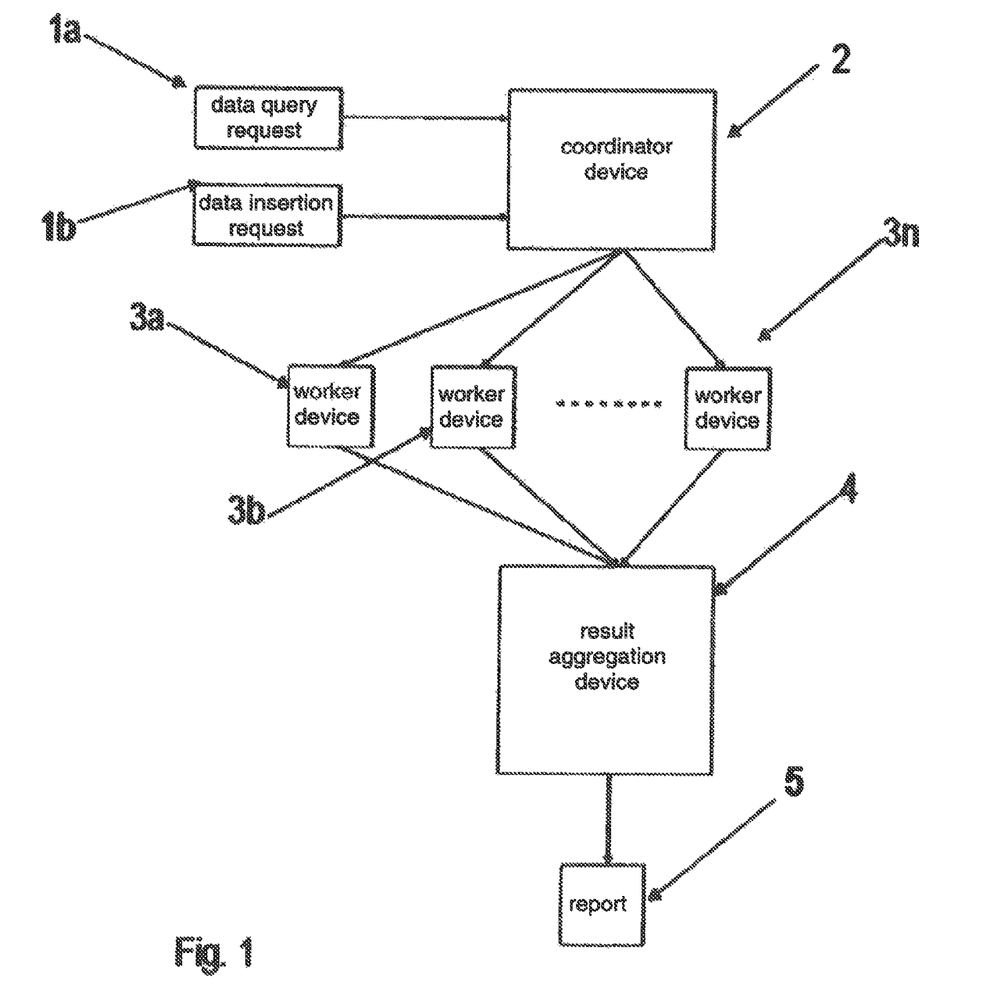
FIG. 1 shows a flowchart of a system according to the present invention.

FIG. 1 shows an embodiment of the present invention in form of a system for searching through data volumes. The system comprises a coordinator device 2 for receiving external task request and coordinate distribution of tasks, where the external task request can be either a data query request 1a or a data insertion request 1b. Thereafter, one or more worker devices 3a-n for receiving and processing task requests from the coordinator device 2, where the task can be either an insertion of data into a searchable data structure, a query of single element within the data structure, or a query of sequence of elements within the data structure. Then a result aggregation device 4 for receiving task requests from the one or more worker devices 3a-n, where the task contains query result information from each of the worker devices. The result aggregation device then sorts the query results from each of the workers, aggregates the results, and generates a detection report 5 from the results. The embodiment is characterized in that the data is a file or data stream, which can be described by a set of numerical vectors in high-dimensional space. Furthermore the data structure residing on each worker device, is a high-dimensional data structure, where the aggregation device aggregates the results first on a data descriptor bases, and secondly on a data descriptor group bases. According to this embodiment, the devices are computer processor enabled devices capable of executing program instructions.

Figure 2:
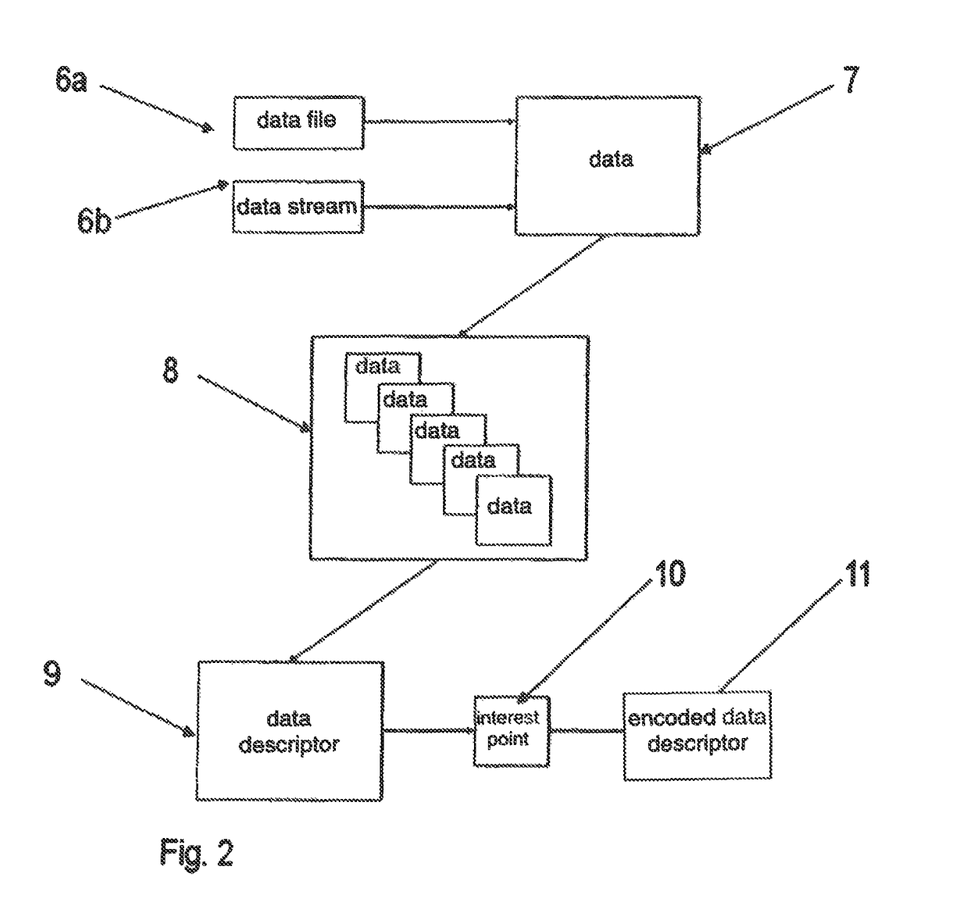
FIG. 2 shows a flowchart of the methods used in the system of the present invention.

FIG. 2 outlines the methods used in a preferred system according to the present invention.

The method for extracting data descriptors for insertion/query of data preferably comprises the steps of:
a) receiving data from a data file 6a or a data stream 6b,
b) dissembling the data 7 into chunks of data 8,
c) extracting data descriptors 9 from the chunks of data 8,
d) selecting interest points 10 within the chunk of data 8, and
e) encoding 11 the interest points as a descriptor (numerical vector).

The method for inserting encoded data descriptors into high-dimensional data structure, according to the embodiments above, preferably comprises the following steps:
a) receiving encoded data descriptors 11,
b) determining which workers device 3a-3n the data descriptor belongs to, transmit the data descriptors to the workers device, and
c) inserting the data descriptor into the high-dimensional data structure residing at the workers device.

The method for querying high-dimensional data structure using encoded data descriptor, according to the embodiments above, preferably comprises the following steps:
a) receiving encoded data descriptors 11,
b) determine which workers device 3a-3n the data descriptor belongs to, transmit the data descriptors to the workers device,
c) querying the high-dimensional data structure residing at the workers device with the data descriptor.

Figure 3:
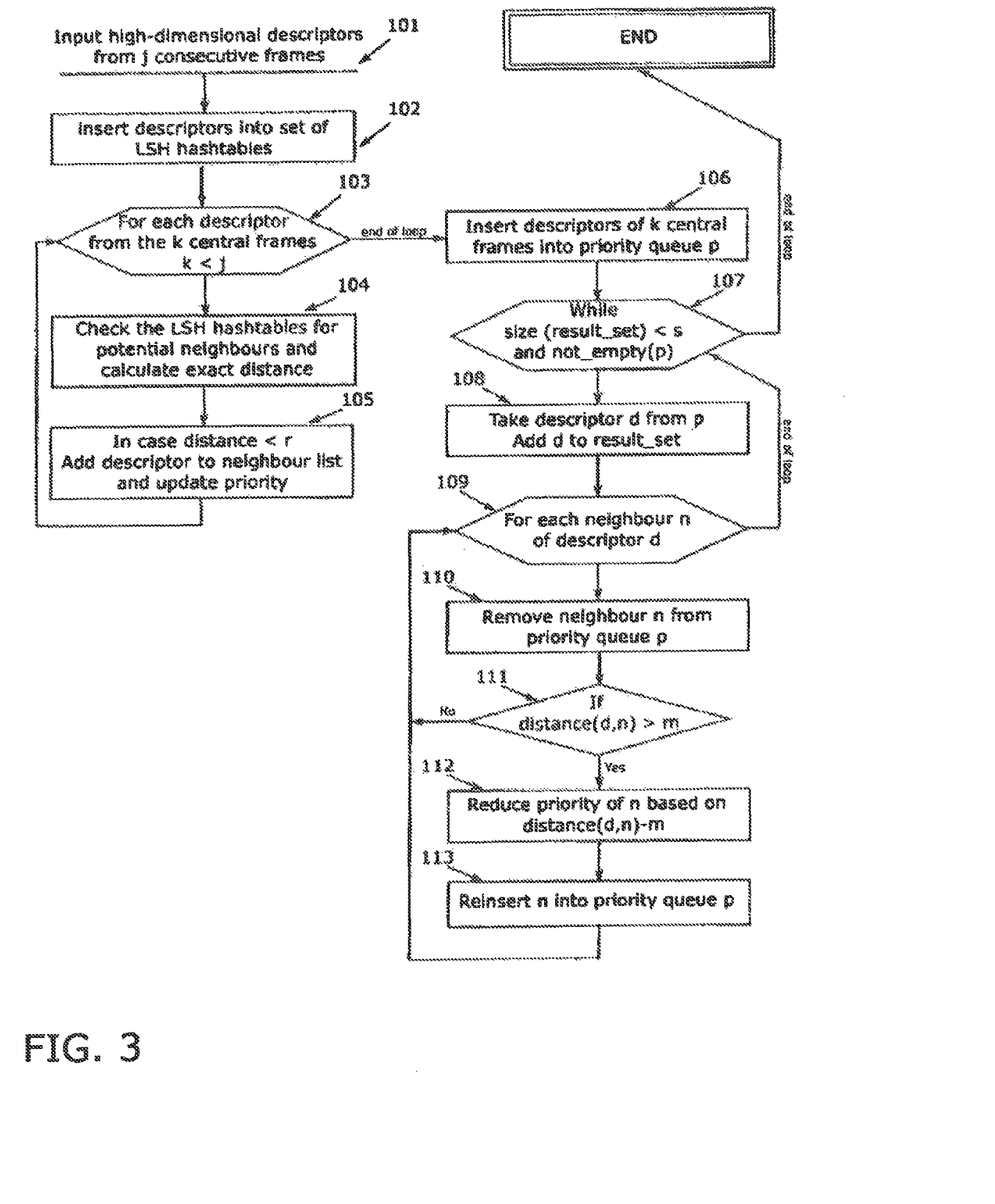
FIG. 3 shows a flowchart of a first filtering method according to the present invention.

FIG. 3 shows the first filtering step of the Multimedia Identifier, starting from a set of high-dimensional descriptors extracted from j consecutive frames 101. The process starts by inserting all descriptors from 101 into a set of LSH hash tables 102. The LSH hash tables group those descriptors together that are likely to be close in distance. For each descriptor originating from the central frames 103, the system calculates the exact distance to all descriptors that landed in the same LSH-hash buckets 104. In case this exact distance falls below a fixed distance threshold r, the descriptors are linked together via their individual neighbour lists and both of their priorities are increased relative to the inverse of their distance 105.

After the loop of 103 has finished, the descriptors of the k central frames are inserted into a priority queue p 106. As long as this queue is neither empty, nor the result set has exceeded a maximum size s 107, the descriptor d with the highest priority is removed from p and added to the result set 108.

Then all neighbours of d 109 are also removed from p 110. Depending on the distance to d these neighbour descriptors are either dismissed (in case the distance falls below the threshold m (m<r) 111 or, alternatively reduced in priority by the factor distance (d,n)−m 112 and reinserted into the priority queue p 113. In case the exit condition in 107 is met the result set is declared as final and the descriptors within this set are handed over to the second-step filtering process.

Figure 4:
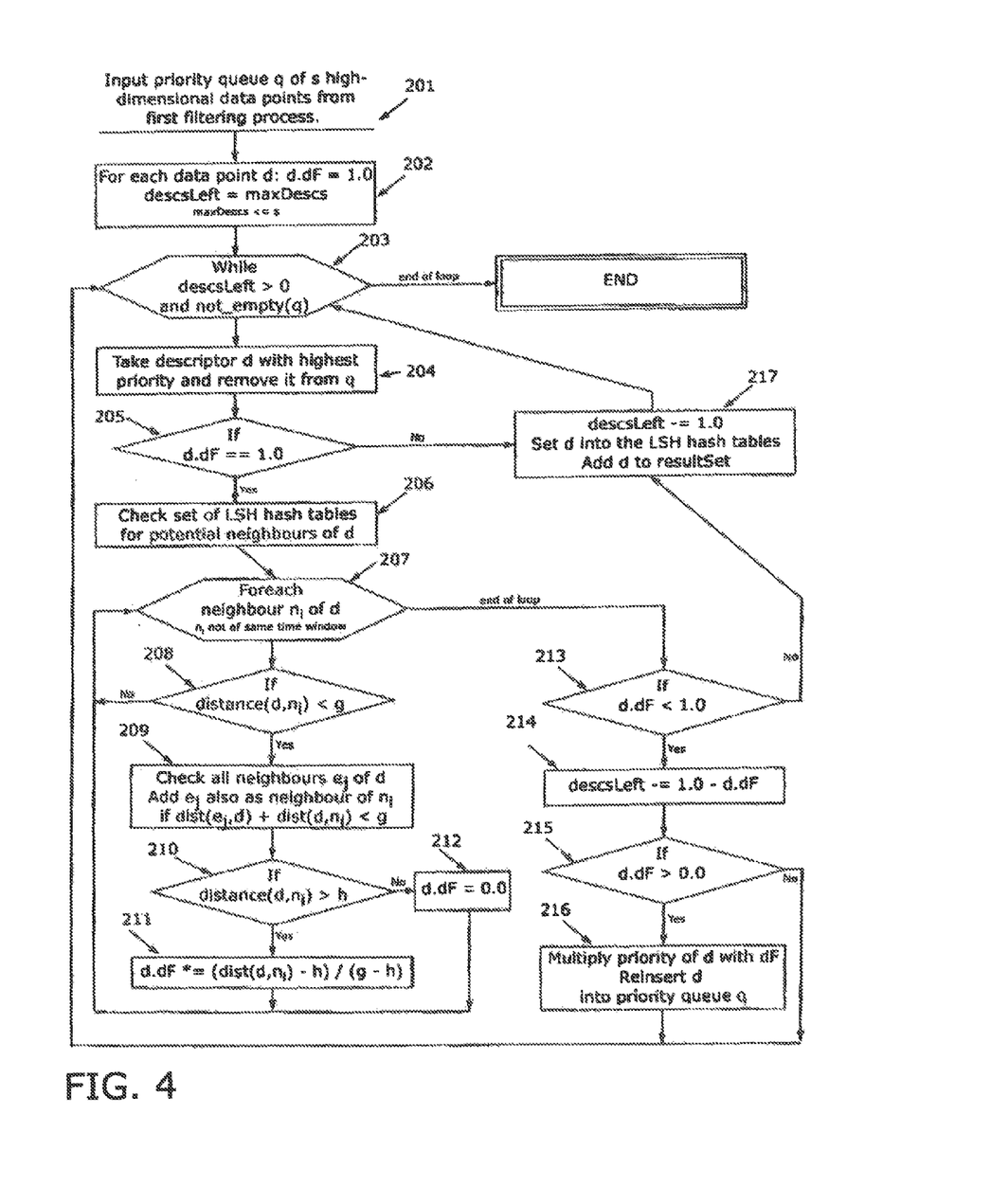
FIG. 4 shows a flowchart of a second filtering method according to the present invention.

FIG. 4 shows the second filtering step of the Multimedia Identifier from a set of s high-dimensional descriptors (from the first filtering step) 201 sorted by priority within a queue q. From those s descriptors a maximum of r descriptors shall be retained after this second filtering step. Therefore a counter descsLeft is established and initialized with maxDescs 202. As long as this counter is larger than 0 and q is not empty 203, the descriptor d with the highest priority is removed from q 204. This descriptor d is checked against a second set of LSH hash tables (not the same as in 102/104) for potential neighbours in previous filtering rounds (see 309/310) and variable dF (distinct factor) is set to 1.0 205.

For each potential neighbour $n_i$ found within the LSH hash table buckets 206 the distance between d and $n_i$ is calculated. In case this distance is larger than a minimum threshold g 207 $n_i$ is not regarded any further. Otherwise all direct neighbours $e_j$ of d (identified in 105) are checked against $n_i$ and an upper distance threshold between $e_j$ and $n_i$ is calculated (via the triangle in equation). In case this distance threshold is smaller than g, $e_j$ is also added to the direct neighbour list of $n_i$ 208. These added neighbours are later used to identify scene cuts in the media stream. In case distance dist(d, $n_i$) is also smaller than a second much smaller threshold h 209, the two descriptors d and $n_i$ are regarded as nearly identical and distinct factor dF is set to 0 211. Otherwise this factor is just decreased relatively to the distance as described in 210.

When all possible neighbours in 206 have been checked against d, the final distinct factor dF is evaluated. In case no similarity between d and the descriptors already within the LSH hash table can be detected (dF still 1.0) 212, descsLeft is decreased by 1 and descriptor d is added into the LSH hash tables and to the resultSet 216. Otherwise descsLeft is decreased by (1.0−dF) 213 and—in case there was not a nearly identical descriptor of d already in the LSH hash table 214—d is reinserted into priority queue q, however with priority decreased by factor dF 215. When all descriptors in the queue have been removed or descsLeft has fallen below 0 the loop 203 terminates. Within the resultSet are the filtered descriptors that have also surpassed this second filtering step.

Figure 5:
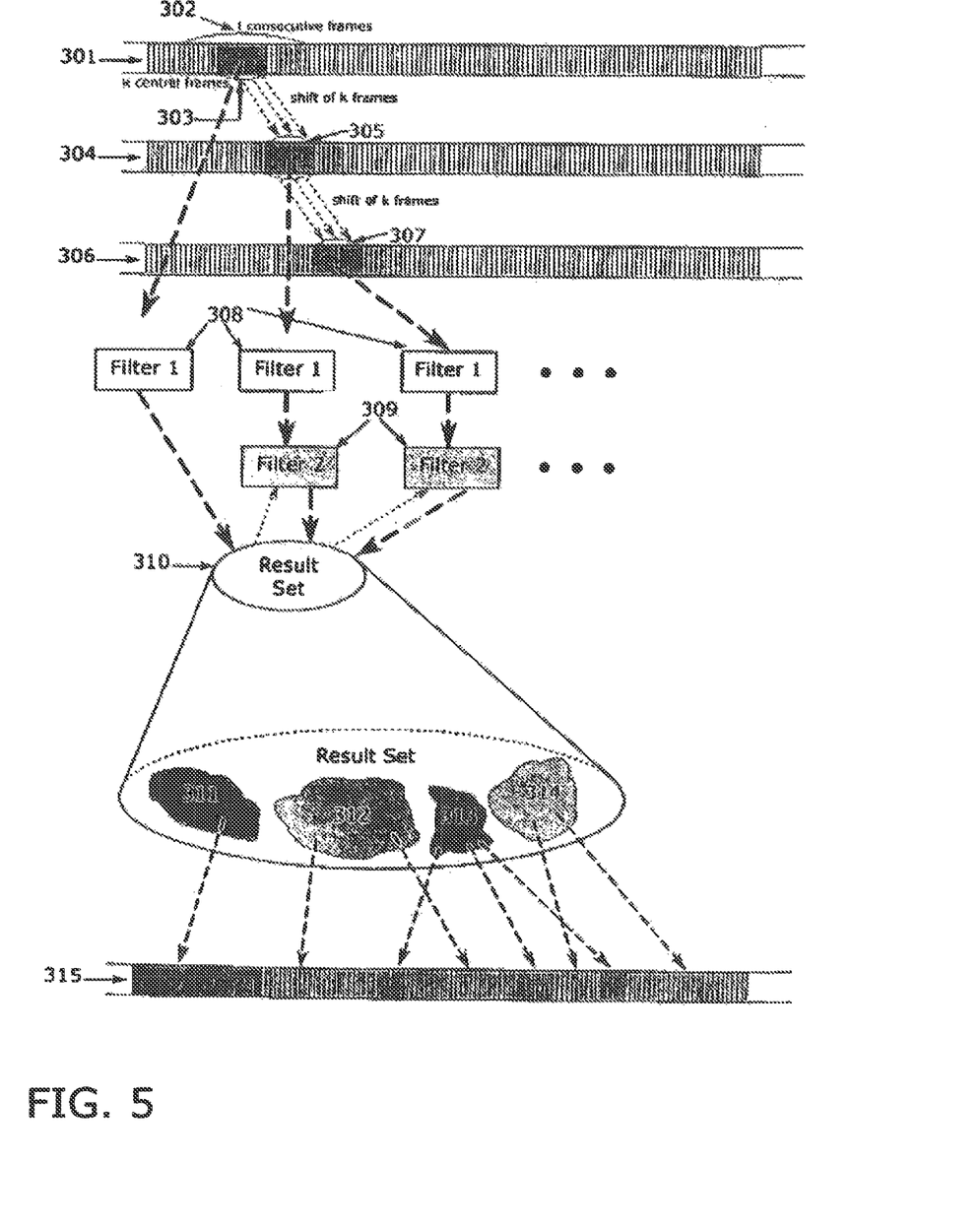
FIG. 5 shows a flowchart of a further filtering method with a 2-phase-filtering process according to the present invention.

FIG. 5 shows a 2-phase-filtering process which is usually repeated over a whole stream of consecutive frame windows, thereby shifting the evaluation window of j consecutive frames for an amount of k frames to the right and again restarting the filter process. Referring to FIG. 5a showing the filtering process over a whole data stream 301 of frames and 302 the selection of j consecutive frames within this stream (basis of the first filter 101). In the center of these selected frames a second time-window of k frames 303 (as used in 103) is determined. All descriptors within this central window 303 are run against the first filter 308 and the remaining descriptors—assuming the result set 310 is empty—are directly added to the result set 310 and to the second set of LSH hash tables as referred to by 205.

In a next step the two windows in the data stream are moved for k frames 304 and all descriptors of the new central window 305 are also run against the first filter 308. As the result set 310 no longer is empty, the descriptors surpassing the first filtering step are also run against the second filter 309 and the resulting descriptors are added to the result set 310.

In a next step the frame windows are again shifted 306 and the descriptors within the center window 307 are run against filter 1 and 2 before being added to the result set 310. This loop repeats until the data stream ends or the result set 310 exceeds a predefined number of descriptors.

Then the result set is split up into smaller sets of descriptors (311-314), each set containing between 30 and 2000 descriptors. This splitting procedure is designed to be optimal in terms that the total of all sets span over a minimum amount of frames the descriptors are extracted from or have neighbours to. Therefore the data stream is first cut into scenes 315. The scene borders are thereby determined where the neighbourhood of descriptors between frames yields a minimum (using the neighbour lists created in 105 and 208). Then the descriptors of the result set are assigned to one or more scenes. In case a minimum threshold of descriptors are assigned to more than a single scene, those scenes are merged together (under consideration of the maximum threshold for descriptor buckets, otherwise they are just linked together). Most often this merging leads to larger continuous scenes e.g. 311, sometimes however they are also split (see especially 313, which separate the otherwise continuous scenes 312 and 314). Scenes such as 313 are recognized of representing highly similar content, such as refrains in songs or an interview within a TV show.

After the final structure of the scenes has been determined the descriptors are again assigned to exactly one scene via a good approximate bin-packing algorithm (as bin-packing is NP-complete).

Each bucket of descriptors is finally handed together with the scene information to the database in order to query or insert the descriptors.

Figure 6:
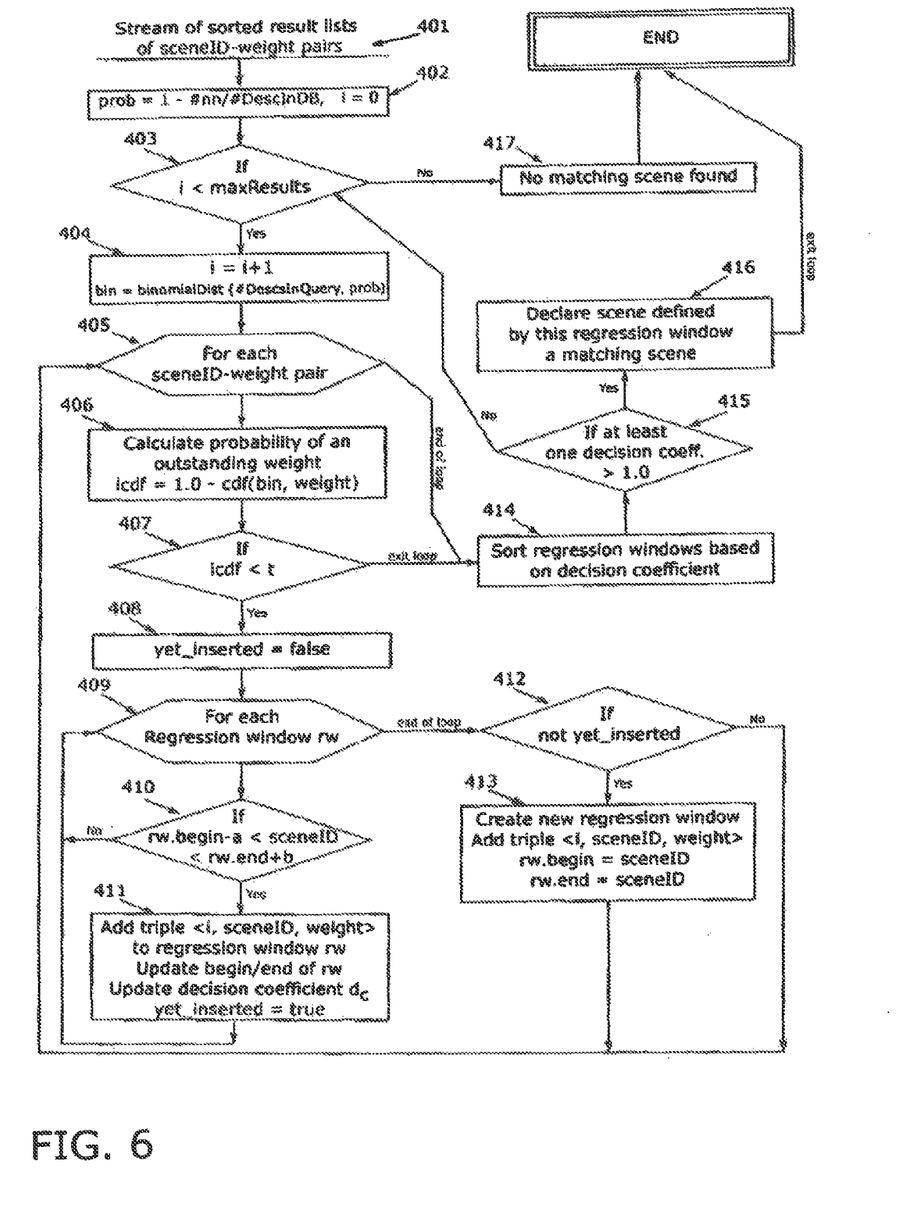
FIG. 6 shows a flowchart of an aggregation method according to the present invention.

FIG. 6 describes how to aggregate a stream of result lists, each list entry containing a scene identifier sceneID and an associated weight 401 and determine a matching signal. At first the probability prob is calculated and the index variable i is set to 0 402. The probability prob expresses that a certain descriptor does not yield a match when querying a random single descriptor in the database.

Figure 7:
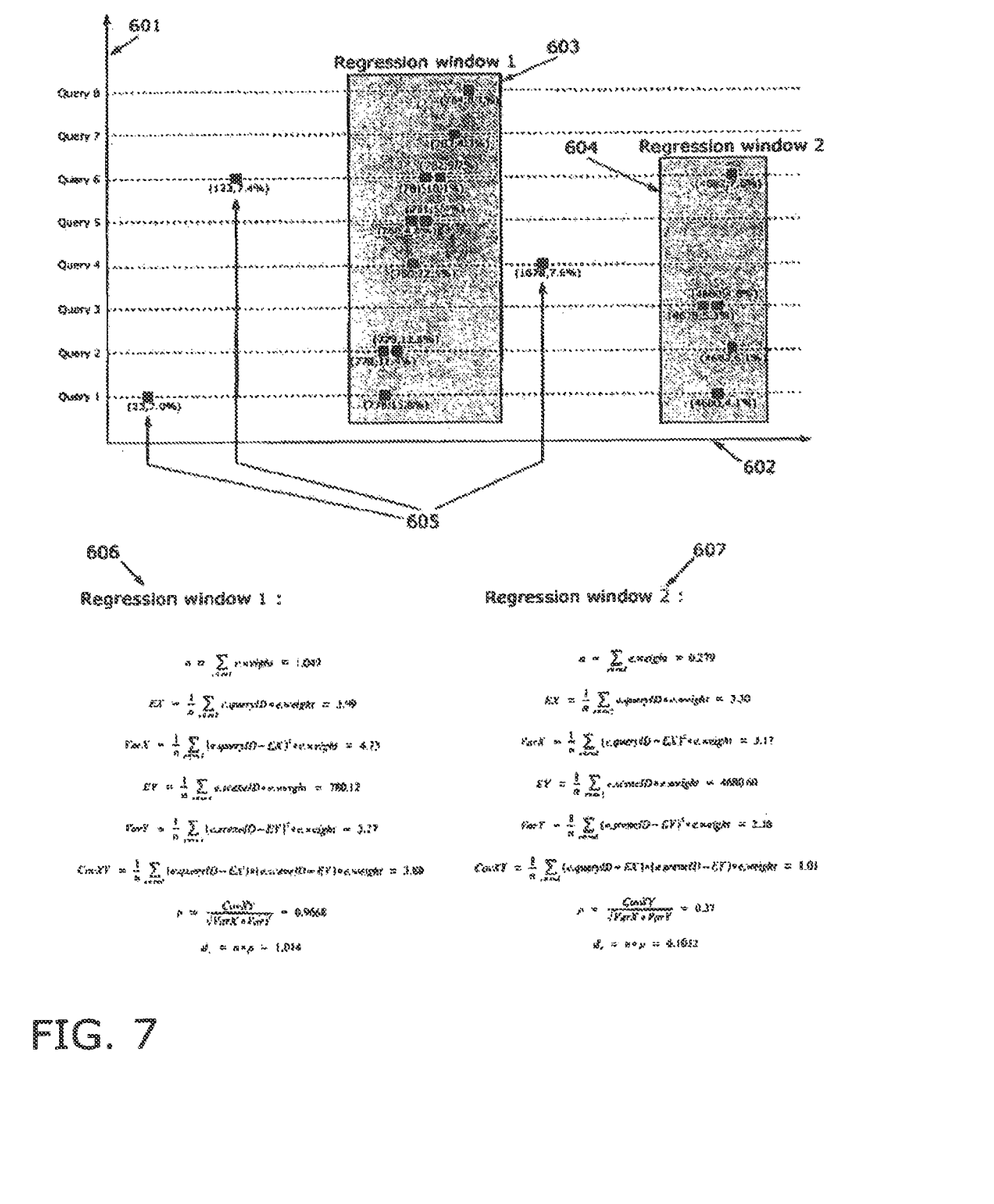
FIG. 7 shows an example for calculating and evaluating the decision coefficient of a regression window.

In case i has not exceeded an upper threshold of results (indicating that after evaluating maxResults of results without a match there is likely to be no match at all) 403, the first result list is withdrawn from the stream and the index Variable i is increased by 1 404. In order to calculate an accurate probability threshold for this particular result set a binomial distribution bin is initialized with the number of query descriptors and the probability as parameter 404. As a next step the result list is evaluated for potential signals. The first scene identifier—weight pair is selected from the (already in respect to weight sorted) list 405 and the inverse cumulative distribution function icdf of the weight within the binary distribution bin is calculated 406. In order to minimize the occurrence of false positives a very small minimum threshold (e.g $1/1000000$) is selected and the icdf is compared to it 407. Just when icdf falls below this threshold it is considered for the regression process. Each scene identifier—weight pair surpassing this filter must then be inserted into at least one regression window, therefore initializing a flag yet_inserted with false 408. Then the pair is checked again all yet existing regression windows 409. Each regression window rw is assigned to a scene range begin . . . end defined by its representative. In case the selected scene identifier falls within the same interval as rw or—more likely—slightly outside of it (characterized by the constants a and b) 410, the result list identifier i is added to the scene identifier—weight pair and this triple <i, sceneID, weight> is inserted into the regression window rw 411. Furthermore, the begin-end boundaries of rw are updated according to the newly inserted triple, the decision coefficient $d_c$ (example in 606 and 607) is recalculated and the flag yet_inserted is set true. In case the scene identifier—weight pair does not fit with any existing regression window 412, a new regression window is created from this pair 413.

After all signals from the current result list have been evaluated the regression windows are sorted based on their decision coefficient 414. If one of the decision coefficients is larger than 1.0 415 the scenes defined by this regression window (begin up to end) are declared as matching the query stream 416. In case no decision coefficient is larger than 1.0 the next result list is drawn from the stream, or—in case the maximum threshold maxResult has been reached—the process is stopped and the query stream is declared to have no match in the database 417.

FIG. 7 gives an example for calculating and evaluating the decision coefficient of a regression window. On the vertical axis the individual queries are drawn 601, while on the horizontal axis the actual scenes in the database are specified 602 (comment: The scale of the horizontal axis is monotonic but not accurate). Within the graph, 18 points are drawn displaying the scene identifier—weight pairs that have undercut the probability threshold t 407. All those points have been inserted into regression windows as outlined in 409-413. This yielded two big regression windows (603 has 10 entries, 604 has 5 entries) and three small ones that consist just of a single <queryID, sceneID, weight> triple 605. For all those regression windows a decision coefficient dc is calculated. In order to yield a meaningful correlation coefficient a regression window needs to contain a minimum number of 4-10 triples and span over a minimum interval of 3-5 units on the horizontal as well on the vertical axis. If this is not the case, the decision coefficient is set to 0. Obviously for all three regression windows 605 this is the case and they can therefore be disregarded. Regression window 1 shown in 603 is, however, very strongly correlated. In 606 expectation values and variance along the two axis are calculated. Together with the covariance they are needed for calculating the correlation coefficient $\rho$ which is with 0.9667 close to the maximum of 1.0. Multiplying the correlation coefficient with the cumulative weight n yields after evaluating 8 queries (result lists) a decision coefficient higher than 1.0 for the first time. The query can be stopped therefore and the query stream is declared matching the scenes 778-784 in the database. As Regression window 2 in 604 has only 5 triples, its suspect to lower threshold. Calculating the correlation coefficient $\rho$ 607 confirms this, as it yields just 0.37. The decision coefficient dc could already be dismissed based on this very low $\rho$, but even when it is calculated it would yield 0.1032 which is far below the matching threshold of 1.0.

Example

The implementations of the invention being described in the following text is relates to video data, while it obviously can also be used for any other kind of multimedia data, or the search in other complex non-textual data (protein structures, genome data, etc.), and it can obviously be varied in many ways. Such variations are not to be regarded as a departure from the spirit and scope of the present invention, and all such modifications as would be obvious to one skilled in the art are intended to be included within the scope of the claims.

1. Descriptor Extraction:

The descriptor extraction process takes in a video file or, alternatively, a video stream and splits it into a sequence of still images (so-called frames). For each second of video material a fixed number of those frames is chosen and sent towards the descriptor extraction process. The descriptor extractor identifies many stable interest points in the frame and encodes the signal around those points in a numerical vector of high dimensionality (descriptor).

2. Descriptor Filter:

As neighbouring frames inside videos are usually very similar, they yield also many similar descriptors. In order to reduce this redundancy, the descriptors are processed in a time dependent manner. A time window of 0.25-5 seconds defines the actual position in the filtering step. All descriptors extracted from frames belonging to this window are inserted into a Locality Sensitive Hashing data structure (LSH) in order to identify clusters of close-duplicate descriptors. Out of these descriptor clusters a fixed number of descriptors are selected (as outlined in Phase 2.a) and passed on to the second filter step (Phase 2.b). Next, the time window is shifted (a=0.2-1 times the duration of the time window), and the process is repeated.

2.a First Filter Step:

Depending on the overlap between the time windows a sub-window of size a is created around the window centre. All descriptors belonging to frames inside this sub-window are now queried for their neighbours within a radius r and each such neighbour adds to the total score of the descriptor, depending on its distance from the original descriptor.

Next, all descriptors are sorted according to this accumulated score and the one with the highest score gets selected into the result set. All its neighbours' scores are decreased depending on their distance to the selected candidate and a counter c is updated. The descriptors are sorted again and the whole process continues until counter c exceeds a fixed threshold n (number of descriptors per window) or the candidate set has become empty.

While this first filtering step already reduces the number of descriptors significantly by keeping the best representatives, we can reduce the amount of descriptors even more by a second filtering step.

2.b Second Filter Step:

All descriptors selected in the first round are also inserted in a second, separated set of LSH hash tables. In case a close-duplicate is found while inserting into this second-step LSH hash table, the descriptor is filtered out (removed), replaced with a link to its close-duplicate and the counter c is updated with a distance dependent value. The linkage between the descriptors in the second filtering step is used to identify scenes of similar content.

Depending on the visual content of the video (the rate of visual change in the video, the number of cuts) the number of descriptors can be reduced significantly. Keeping track of in which frames close-duplicate descriptors appear and vanish, we can identify stable scenes (scenes without much change in the video) and transitioning scenes. The descriptors are then assigned to one or more of such scenes based on this information. If several descriptors fall within the same group of scenes, those scenes can be regarded as visual similar and based on this information links between those scenes can be created, even if those scenes are non-adjacent. Those links can be again used for further compression, preferably for videos that should be inserted in the database, as the time-window for filtering might be significantly large, in some cases even covering the whole video.

However, searching in larger time-windows during the filtering process is not desirable as large windows increase the processing time of the filtering phase. Instead early inserts into the whole collection might be a better alternative. In order to nonetheless identify ties between scenes the insert operation should be preceded by a query operation. In case a scene-Tie is detected two different options are possible. The two scenes are actually merged by assigning the same identifiers to the descriptors of both scenes or—alternatively—by externally linking the two scenes, e.g. in an external relational database.

3. High Dimensional Index Search:

In this step, the previously into scenes grouped descriptors are queried for or inserted into the high-dimensional index. Preferably a set of NV-trees (alternatively LSH-hash tables) is used for this purpose. For each individual descriptor up to 1000 neighbouring descriptors are retrieved. Each retrieved neighbour yields a vote for the scene it belongs to. The result sets of all descriptors from the same query scene are then aggregated on a votes-for-scene basis. This aggregated list is then sorted in descending order, so that the scene which got the most votes stays on top of the list. These ranked result lists are then checked, for one or more strong signals. An example of such a signal detector is the binomial distribution:

$$P(\min(X_1 \ldots X_n) > x) = (1 - Bin_{m,p}(x))^n$$

m . . . number of query descriptors in a group n . . . number of descriptor groups inside the NV-tree database p . . . number of nearest neighbours retrieved per descriptor/n x . . . accepted error probability rate (rate of potential false positives)

To reduce the occurrence of potential false positives in the result even further, the candidates that pass this signal detector can be compared in detail to the frame sequence the query descriptor groups represents. One very fast—but still effective—method is to compare the relative locations of the matching points between a representative query frame and the points represented in the NV-tree database. The remaining signals (each representing a separate descriptor set in the database) are passed on to further aggregation.

4. Improved Database Size and Throughput Due to the Distribution of the High Dimensional Index Structure:

To scale a video detection system up for very large data collections, the extraction as well as the database load needs to be distributed onto several entities.

First, the descriptor extraction workload can be distributed onto multiple CPUs—or specialized hardware such as a graphics processor—to reach and exceed real-time performance. The same applies to the filtering process. In the database unit the parallelization becomes more complex, especially because the database index structure can undergo significant changes over time due to the insertion or deletion of entries. Furthermore, extremely large collections of high-dimensional data (>1 billion descriptors) require a significantly large amount of RAM-memory (>16 GB) in order to provide high query and insertion throughput.

All these issues have been addressed in the following setup of a distributed high-dimensional index structure: Such a high-dimensional indexing method must be built upon the principle of projection and partitioning, as the NV-tree indexing technology (preferred), or a Locality Sensitive Hashing structure. This principle makes it possible to employ separate pieces of hardware for individual sub-parts of the index (a sub-tree of the NV-tree data structure, or a subset of hash table buckets for LSH), making each node in the system responsible for updating and querying one specific sub-part of the whole index structure.

Such a distribution system consists of three different kinds of entities:

The Coordinator Unit:

The coordinator node functions as a server program which waits for incoming queries or insertions. Typical requests consist of a set of 30-2000 local descriptors. Once such a query or insertion has been received, the server starts processing the individual descriptors of that specific operation while it continues listening for new requests. The server takes the descriptors one by one and traverses the first part of the index structure. For an NV-tree the upper hierarchies of the tree are traversed until a node is reached which contains the address of the assigned worker node; respectively for LSH the first i digits of the hash key are computed, which are then used to look up the responsible worker's address in a table). The assigned worker unit is then sent a packet containing the descriptor information so that the processing can continue at this node.

To yield high quality answers it is recommended to use multiple high dimensional index structures (multiple NV-trees or LSH hash tables). As each separate index structure can be distributed on a separate set of worker units, the coordinator sends the descriptor information to one specific worker for each of those index structures. Once this is done, the next descriptor is taken from the query set until all descriptors have been processed and the thread terminates.

The Worker Units:

The worker units wait for incoming requests from the coordinator. Once a packet is received, the descriptor is sent towards the lower part of the index structure (a sub NV-tree or a subset of all hash table buckets for LSH) residing on the worker machine and a ranked result list of close descriptor identifiers is retrieved from the final leaf node or hash bucket. The ranked identifier list is then transmitted to the result aggregation unit. The worker now resumes waiting.

Result Aggregation Unit:

The result aggregation unit waits for incoming result packets from the workers. As result sets from a single descriptor can come from several worker machines (dependent on the number of different index structures), the result aggregation units sorts all incoming packets and aggregates the results, first on a single descriptor basis and afterwards on a scene basis. At the end of this aggregation process a list of scene identifiers and its weights are returned. This weighted list is sorted and run through a signal detector as specified in (3) and sends the results to scene match aggregator, which looks at the results of consecutive scenes (frames).

5. Scene Match Aggregator:

The output of the result aggregation unit in (4) is transmitted to the scene match aggregator. First it sorts the scene results based on the time line, and starts to perform a correlation analysis. It checks whether there is a strong statistical correlation between the consecutive query scenes (frames) and the matches of those queries in the database. As the consecutive query scenes are can be associated with certain time intervals in the query stream and the results scenes can be also associated with time intervals of videos inserted before, a regression profile can be easily calculated. As the results obtained from the result aggregation unit are weighted, those weights are also incorporated into the calculation of the regression profile.

To retain a stable answer, a defined threshold of 3-30 scene queries needs to be evaluated. The results on those queries are then separated into regression windows which must not exceed a defined time interval (proportional to the time window of the queries). In case regression windows contain at least a minimum of 3-20 results a reliable correlation coefficient $\rho$ can be calculated. This correlation coefficient is usually combined with the signal strength of the detected results (in percentage of the query descriptors), as they give the second level of confidence on the matching. There are many ways to actually combine correlation and signal strength into such a decision coefficient, one possible implementation is the following:

$$\text{decision coefficient } d_c = \rho * \Sigma(\text{result's signal strength})$$
$$\text{in case } \rho >= 0.3$$
$$= 0 \text{ in case } \rho < 0.3$$

In case the correlation exceeds a defined threshold ($d_c$>threshold, e.g. threshold=1) a match is declared. The higher this recall threshold is chosen, the probability of yielding false-positive matches is decreased while the probability of losing a correct match is increased. On the other hand, any further evaluation of the query clip can be stopped and declared as a no-match in case the correlation coefficient is very low and falls below a defined threshold (e.g. 0.01 for the above example). If the coefficient falls in between the two thresholds the evaluation of the clip continues until either the correlation reaches above or falls below one of the two thresholds or the query stream ends.

All matches which surpass the upper threshold are stored in a standard relational database system and can be displayed in a detailed report on which previously indexed database content the queried material was matched to.

The invention has been illustrated and described in detail in the drawings and foregoing description. Such illustration and description are to be considered in an illustrative or exemplary and non-restrictive manner, i.e., the invention is not limited to the disclosed embodiments. Moreover, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be considered as limiting the scope.

The invention claimed is:

1. A method for encoding data of a data file or a data stream and feeding the encoded data into a database, the method comprising:
   (a) collecting data which defines a set of consecutive frames taken from a time window of the data file or the data stream and encoding said data by extracting numerical high dimensional descriptors representing a content within said set of consecutive frames,
   (b) selecting representative descriptors from said set of consecutive frames, by:
      (i) clustering numerical high dimensional descriptors by finding all neighboring descriptors within the set of consecutive frames, wherein a neighborhood relationship between two descriptors is defined by a radius; and
      (ii) sorting descriptors based on their neighborhood relationships and selecting representative descriptors from each neighborhood cluster to filter out redundant descriptors,
   (c) creating a set of the selected descriptors,
   (d) labeling the selected descriptors in the set with a unique identifier,
   (e) comparing each of the selected descriptors in the set with descriptors from previously created sets having identifiers different from the unique identifier;
   (f) filtering at least one descriptor from the set upon determining that the at least one descriptor is a close neighbor to a descriptor from a previously created set;
   (g) replacing the filtered at least one descriptor with a link to the close neighbor descriptor from the previously created set; and
   (h) repeating steps (a) to (g) for a new time window that is shifted from the time window by an amount between 0.2 times and 1 times a duration of the time window,
   wherein the identifiers of the descriptors are stored on one or more storage areas or devices, and wherein the identifiers are organized on said one or more storage areas or devices such that identifiers of spatially closely located descriptors within a high dimensional space are with high likelihood stored within the same device area or partition.

2. The method as recited in claim 1, wherein the numerical high dimensional descriptors have 15 or more dimensions.

3. The method as recited in claim 1, wherein a set of descriptors representing a range of consecutive frames containing the same or largely similar content are defined as describing a scene.

4. The method as recited in claim 3, wherein a temporal locality of each scene is stored in a separate lookup file on a storage device.

5. The method as recited in claim 1, wherein a temporal locality within data streams suggests that it is very likely that the same or very similar scenes are recurring within a short interval.

6. The method as recited in claim 1, wherein the data stream is visual information.

7. The method as recited in claim 1, wherein the data structure residing on each storage device is a Nearest Vector Tree data structure or an LSH hash table.

8. The method as recited in claim 1, wherein spatial relationships between descriptors are determined using a Euclidian distance measure, a Manhattan distance measure, or a Hamming distance measure.

9. A non-transitory computer-readable medium having computer-executable instructions stored thereon that, in response to execution by a processor of a computing device, cause the computing device to perform actions comprising:
   (a) collecting data which defines a set of consecutive frames taken from a time window of a data file or a data stream, and encoding said data by extracting numerical high dimensional descriptors representing a content within said set of consecutive frames,
   (b) selecting representative descriptors from said set of consecutive frames, by:
      (i) clustering numerical high dimensional descriptors by finding all neighboring descriptors within the set of consecutive frames, wherein a neighborhood relationship between two descriptors is defined by a radius; and
      (ii) sorting descriptors based on their neighborhood relationships and selecting representative descriptors from each neighborhood cluster to filter out redundant descriptors,
   (c) creating a set of the selected descriptors,
   (d) labeling the selected descriptors in the set with a unique identifier,
   (e) comparing each of the selected descriptors in the set with descriptors from previously created sets having identifiers different from the unique identifier;
   (f) filtering at least one descriptor from the set upon determining that the at least one descriptor is a close neighbor to a descriptor from a previously created set;
   (g) replacing the filtered at least one descriptor with a link to the close neighbor descriptor from the previously created set; and
   (h) repeating steps (a) to (g) for a new time window that is shifted from the time window by an amount between 0.2 times and 1 times a duration of the time window,
   wherein the identifiers of the descriptors are stored on one or more storage areas or devices, and wherein the identifiers are organized on said one or more storage areas or devices such that identifiers of spatially closely located descriptors within a high dimensional space are with high likelihood stored within the same device area or partition.

10. The computer-readable medium as recited in claim 9, wherein the numerical high dimensional descriptors have 15 or more dimensions.

11. The computer-readable medium as recited in claim 9, wherein a set of descriptors representing a range of consecutive frames containing the same or largely similar content are defined as describing a scene.

12. The computer-readable medium as recited in claim 11, wherein a temporal locality of each scene is stored in a separate lookup file on a storage device.

13. The computer-readable medium as recited in claim 9, wherein a temporal locality within data streams suggests that it is very likely that the same or very similar scenes are recurring within a short interval.

14. The computer-readable medium as recited in claim 9, wherein the data stream is visual information.

15. The method as recited in claim 9, wherein the data structure residing on each storage device is a Nearest Vector Tree data structure or an LSH hash table.

16. A system for detecting and identifying close-duplicate data files or streams, the system comprising:
   at least one computing device configured to provide a coordinator node for receiving query requests;
   at least one computing device configured to provide one or more worker nodes for executing single descriptor queries in parallel; and
   at least one computing device configured to provide a result aggregation node which receives partial answers from the workers and aggregates them into a final decision;
   wherein the system is configured to perform actions comprising:
      collecting data which defines a frame and encoding said data by extracting numerical high dimensional descriptors representing a content within said frame,
      selecting representative descriptors from said frame or from a set of consecutive frames by filtering out redundant descriptors,
      creating a set of the selected descriptors,
      querying a database comprising known descriptors,
      retrieving all spatially closely related identifiers of the database and aggregating the related identifiers and aggregating the identifiers depending on scene origins of the identifiers,
      in response to determining that an identifier yields a high score, determining that the query descriptors are retrieved from a set of descriptors containing similar data, and
      evaluating the retrieved set by performing a regression test on the retrieved descriptors, wherein a decision of identification is determined when a regression signal exceeds a predefined threshold.

17. The computer-readable medium as recited in claim 9, wherein spatial relationships between descriptors are determined using a Euclidian distance measure, a Manhattan distance measure, or a Hamming distance measure.

18. The system as recited in claim 16, wherein evaluating the retrieved set comprises evaluating the retrieved set of identifier-score pairs, comprising all identifiers that yield a high score, by performing the regression test on this set of pairs.

19. The system as recited in claim 16, wherein the numerical high dimensional descriptors have 15 or more dimensions.

20. The system as recited in claim 16, wherein a set of descriptors representing a range of consecutive frames containing the same or largely similar content are defined as describing a scene.

21. The system as recited in claim 20, wherein the descriptor set representing a scene is compared to a set of previous examined scenes, and in case a strong correlation between two scenes can be detected, the scenes are merged or linked together in a cluster such that the redundant descriptors can be further eliminated.

22. The system as recited in claim 20, wherein a temporal locality of each scene is stored in a separate lookup file on a storage device.

23. The system as recited in claim 16, wherein a temporal locality within data streams suggests that it is very likely that the same or very similar scenes are recurring within a short interval.

24. The system as recited in claim 23, wherein the descriptor set representing a scene is compared to a small set of previously examined scenes and wherein a strong correlation between two scenes is detected results in merging or linking together such descriptors and eliminating redundant descriptors.

25. The system as recited in claim 16, wherein the data stream is visual information.

26. The system as recited in claim 16, wherein the data structure residing on each storage device is a Nearest Vector Tree data structure or an LSH hash table.

27. A method for identifying an unknown data file or data stream on the basis of a database, the method comprising:
   receiving, by a coordinator node provided by a computing device, a query request;
   receiving, by a worker node provided by a computing device, single descriptor queries in parallel with other queries received by other worker nodes; and
   receiving, by a result aggregation node, partial answers from the worker nodes and aggregating them into a final decision;
   wherein queries are processed by:
      collecting, by a computing device, data which defines a frame and encoding said data by extracting numerical high dimensional descriptors representing a content within said frame,
      selecting, by a computing device, representative descriptors from said frame or from a set of consecutive frames by filtering out redundant descriptors,
      creating, by a computing device, a set of the selected descriptors,
      querying, by a computing device, the database comprising known descriptors,
      retrieving, by a computing device, all spatially closely related identifiers of the database and aggregating the related identifiers and aggregating the identifiers depending on scene origins of the identifiers, wherein the spatially closely related identifiers are spatially closely related within a high dimensional space,
      in response to determining that an identifier yields a high score, determining, by a computing device, that the query descriptors are retrieved from a set of descriptors containing similar data, and
      evaluating, by a computing device, the retrieved set by performing a regression test on the retrieved descriptors, wherein a decision of identification is determined when a regression signal exceeds a predefined threshold.

28. The method as recited in claim 27, wherein evaluating the retrieved set comprises evaluating the retrieved set of identifier-score pairs, comprising all identifiers that yield a high score, by performing the regression test on this set of pairs.

29. The method as recited in claim 27, wherein the numerical high dimensional descriptors have 15 or more dimensions.

30. The method as recited in claim 27, wherein a set of descriptors representing a range of consecutive frames containing the same or largely similar content are defined as describing a scene.

31. The method as recited in claim 30, wherein the descriptor set representing a scene is compared to a set of previous examined scenes, and in case a strong correlation between two scenes can be detected, the scenes are merged or linked together in a cluster such that the redundant descriptors can be further eliminated.

32. The method as recited in claim 30, wherein a temporal locality of each scene is stored in a separate lookup file on a storage device.

33. The method as recited in claim 27, wherein a temporal locality within data streams suggests that it is very likely that the same or very similar scenes are recurring within a short interval.

34. The method as recited in claim 33, wherein the descriptor set representing a scene is compared to a small set of previously examined scenes and wherein a strong correlation between two scenes is detected results in merging or linking together such descriptors and eliminating redundant descriptors.

35. The method as recited in claim 27, wherein the data stream is visual information.

36. The method as recited in claim 27, wherein the data structure residing on each storage device is a Nearest Vector Tree data structure or an LSH hash table.

37. The method of claim 27, wherein spatial relationships between identifiers of the database are determined using a Euclidian distance measure, a Manhattan distance measure, or a Hamming distance measure.

* * * * *